United States Patent Office 2,854,856
Patented Oct. 7, 1958

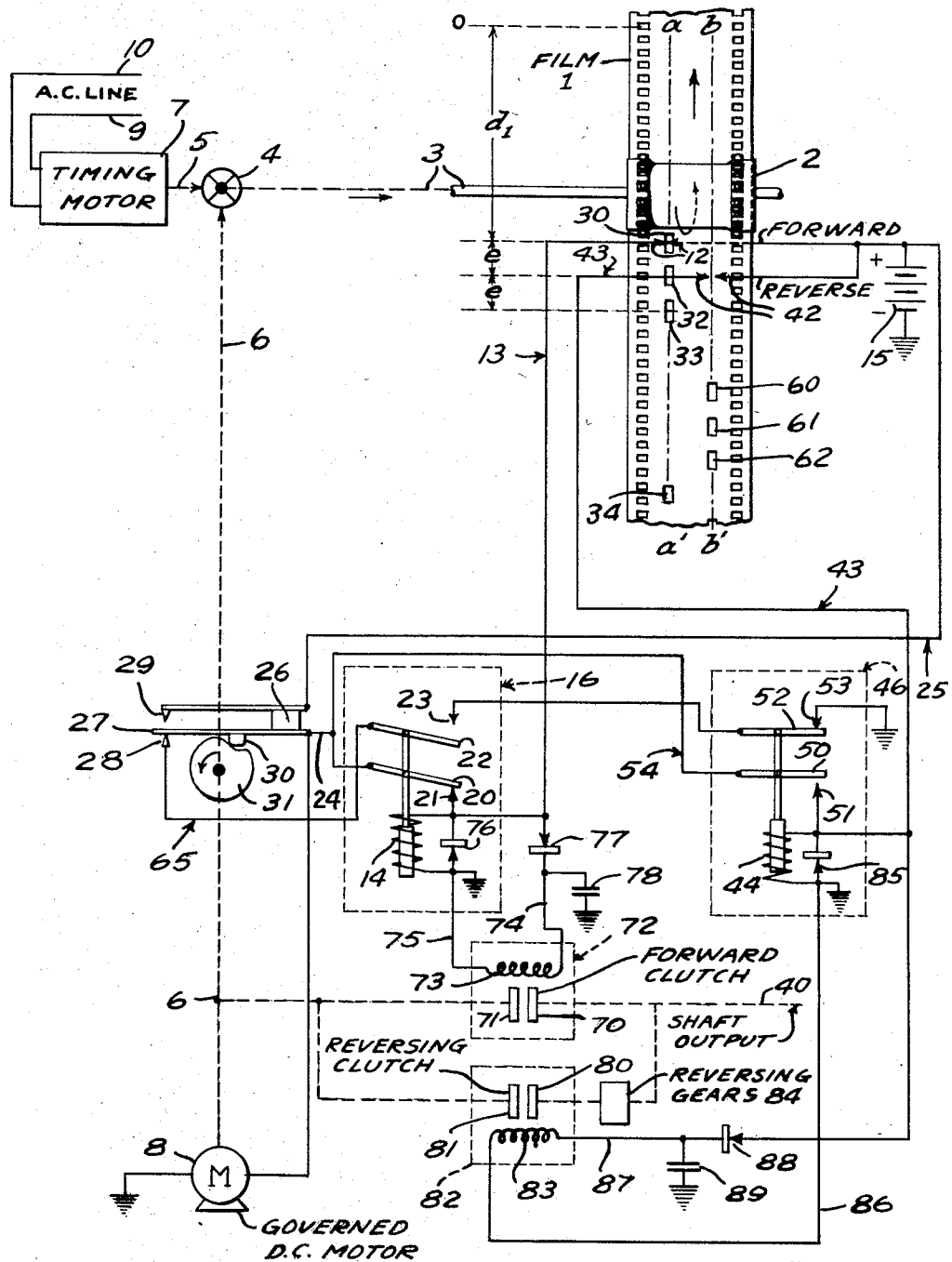

2,854,856

PROGRAMMER

Walter R. Oppen, Plandome, N. Y., assignor to Sperry Rand Corporation, Ford Instrument Company Division, Long Island City, N. Y., a corporation of Delaware Application August 26, 1957, Serial No. 680,150

6 Claims. (Cl. 74—472)

This invention relates to automatic control systems and particularly to programming devices for controlling the operations of apparatus acted upon by these systems in accordance with a predetermined pattern or sequence of events in a schedule of time.

Programming devices conventionally incorporate constand speed motor-driven tapes or films to establish a time base for the desired operations so that events start and stop at scheduled instances of time. The intelligence associated with the required control for each event must be released in the same discrete interval of time allocated for that operation and this intelligence is stored in a length tape which moves past a pickoff point in the subject time interval. Since the length of tape for recording and reproducing each event is directly proportional to the accuracy and complexity of the operations required for that event, the programming tapes and their associated playback equipments become bulky and heavy when it becomes necessary to accurately program complex operations over a long total period of time.

A principal object of this invention is to provide an improved programmer employing a shorter length of tape than is normally required for programming complex operations over a long period of time and operating within predetermined accuracy limits.

The invention is particularly embodied in a programmer, employing sprocket-driven tape having holes punched at selected time intervals for the required operations. In particular, the invention resides in the utilization of slow type transport between scheduled operations and fast tape transport during each scheduled operation or event.

As presently contemplated, the sprocket mechanism for moving the tape is driven by a slow speed synchronous motor through a mechanical differential having its other input shaft connected to a high speed auxiliary motor. Between scheduled events, the auxiliary motor is not energized and the timing motor moves the tape at the slowest rate consistent with the required accuracy for the starting of an operation at any scheduled instant of time. A hole punched in the tape at a selected instant of time permits two pickoff contacts, one on each side of the tape, to momentarily close a first circuit having a relay which energizes the high speed auxiliary motor in a second circuit. Since this auxiliary motor drives one input shaft to the differential, the sprocket mechanism, at that instant, accelerates the tape transport to a high speed.

Rotation of the auxiliary motor also closes a cam controlled switch which provides a means of energizing the relay in parallel with the pickoff contacts. When the starting hole on the tape traverses the set of pickoff contacts, the relay remains closed because of the parallel feed thru the cam controlled switch.

At the conclusion of one revolution of the cam the switch opens and this allows the relay to release, dynamically braking the motor for a quick stop, unless another hole has appeared on the tape before the completion of one revolution. If a second punched hole again permits the pickoff wires to make contact, the relay is kept energized and the high speed transport of the tape is sustained for another cycle of the auxiliary motor. In this manner, the shaft of the high speed auxiliary motor is displaced rapidly and accurately for an integral number of revolutions in direct proportion to the number of holes punched in a segment of tape. Between operations the shaft of the auxiliary motor is held stationary and the tape is driven at its former slow speed by the timing motor. Sequential operations are effected by the selective integral number of revolutions of the auxiliary motor shaft. When the operations require both positive and negative displacements of the shaft being controlled, a line of punched holes are provided on the tape for each direction of displacement. Both lines of punched holes start and stop the high speed auxiliary motor but, additionally, the pickoff contacts along each line of holes also energize separate magnetic clutches between the shaft of the auxiliary motor and the shaft to be controlled. By employing a set of reversing gears in conjunction with one magnetic clutch, the shaft to be controlled can be selectively reversed even though the auxiliary motor shaft revolves unidirectionally.

Other objects and features of the invention will be understood more clearly from the following detailed description taken in conjunction with the accompanying drawing in which:

The drawing is a schematic representation of a programmer incorporating a slow speed tape transport between time scheduled events and high-speed tape transport during time scheduled events.

Referring to the drawing, a tape 1 is driven by a sprocket wheel 2 in a magazine-type of tape transport mechanism (not shown). The sprocket wheel 2 is secured to an output shaft 3 of a mechanical differential 4 having two input shafts 5 and 6. Shaft 5 is driven by a slow speed synchronous timing motor 7 while shaft 6 is driven by a high speed governed D. C. motor 8 having a permanent magnet field, the turning direction of shafts 5 and 6 being established so that the displacement of shaft 3 is equal to the sum of the displacements of shafts 5 and 6. The timing motor 7 is energized by A. C. lines 9 and 10. A pair of pickoff contacts 12 is supported by the frame of the tape transport, each pickoff contact contacting opposite sides of the tape 1 along a line a—a' and aligned in a manner so that the pickoff contacts contact each other whenever a hole is presented by the paper tape in this line. A first circuit 13 comprises in series connection the pair of pickoff contacts 12 and a solenoid coil 14, the circuit 13 being connected across a D. C. power source 15 having a grounded negative terminal. The solenoid coil 14 is a component part of a single-throw double-pole relay 16 having a normally open armature contact 20 in alignment with a fixed contact 21 and a normally closed armature contact 22 in alignment with a fixed contact 23. A second circuit 24 is connected across power source 15 and comprises in series connection the pair of pickoff contacts 12, the fixed contact 21, the armature contact 20 and the high speed D. C. motor 8.

Where no hole is punched along a—a', the pickoff contacts 12 are separated by the tape and circuits 13 and 24, the latter including the D. C. motor 8, are unenergized. With the shaft 6 stationary, the sprocket wheel 2 is driven at the slow speed of the timing motor 7 and the lineal speed of the tape 1 is correspondingly at a low level.

When a hole 30 in line a—a' of tape 1 allows the pickoff contacts 12 to contact each other, the energized solenoid coil 14 of relay 16 closes contacts 20 and 21 for applying the voltage of power source 15 to the motor circuit 24. At that instant, the shaft 6 of motor 8 is accelerated to a high revolution rate and the shaft 3 drives the tape 1 through sprocket wheel 2 at a high lineal rate. With a displacement of shaft 6, the hole 30 in the moving tape 1 travels past the position of pickoff contacts 12 so as to separate the contacts by the tape 1. Such interruption of the energization to the motor 8 would normally cause shaft 6 to stop. However, to prevent this occurrence, a third circuit 25 is provided which is connected across the source 15 and controlled by a single-pole-double-throw leaf switch 26 having a movable contact 27 and fixed contacts 28 and 29, the switch 26 being actuated by a cam follower 30 in contact with a cam 31. Cam 31 is connected to and driven by the motor shaft 6 and the cam has a two-step contour which is designed to effect four operations, viz., establish contact between contacts 27 and 28 when the motor 8 is unenergized, effect the movement of movable contact 27 from contact 28 to contact 29 when the motor shaft 6 makes a small displacement, maintain the latter contact for one revolution of shaft 6 connected to motor 8 and, at the end of this one revolution cycle, effect the movement of movable contact 27 from the contact 29 to the contact 28. The circuit 25 comprises in series connection the fixed contact 29, the movable contact 27 and the high speed motor 8. Hence, when pickoff contacts 12 momentarily make contact as a hole 30 momentarily appears in tape 1 at the pickoff wire location, solenoid coil 14 will attract the relay armature to close contacts 20 and 21 to energize D. C. motor 8. However, a small displacement of motor shaft 6 will close contacts 27 and 29 so that the energization of D. C. motor 8 and relay coil #14 will be maintained for one complete revolution of shaft 6. At the conclusion of the one complete revolution of shaft 6, contacts 27 and 29 open and the energization of motor 8 is interrupted unless another hole 32 is provided in the moving tape 1 to start another cycle for advancing the displacement of shaft 6 by another 360°. Accurate and precise operational control is effected by an output shaft 40 connected to the motor shaft 6. The output transmission system may incorporate a gear reducer (not shown) for converting integral revolutions of shaft 6 into fractional degree revolutions of the output shaft 40.

Since it is generally required to provide for the programming of both forward and reverse displacements of the output shaft 40, another pair of pickoff contacts 42 are positioned along a line $b—b'$ on tape 1. A circuit 43 comprises in series connection the pair of contacts 42 and a solenoid coil 44, the circuit 43 being connected across the D. C. power source 15. The solenoid coil 44 is a component part of a single-throw-double-pole relay 46 having a normally open armature contact 50 in alignment with a fixed contact 51 and a normally closed armature contact 52 in alignment with a fixed contact 53. Another circuit 54 is connected across power source 15 and comprises in series connection the pickoff of contacts 42, the fixed contact 51, the armature contact 50 and the high speed D. C. motor 8.

When a hole 60 in line $b—b'$ of tape 1 allows the pickoff contacts 42 to contact each other, the energized solenoid coil 44 of relay 46 closes contact 50 and 51 for applying the voltage of power source 15 to the motor circuit 54. As explained above, at that instant, the tape transport is accelerated to a high speed for one complete revolution of motor shaft 6 and this shaft will continue to revolve at a high speed until holes 61 and 62 in line $b—b'$ are traversed by the pickoff contacts 42. With no more holes in the line $b—b'$, the tape transport will proceed at the slow speed as determined by the timing motor 7.

For rapid braking of motor shaft 6, a dynamic braking circuit 65 is provided in shunt connection with the armature terminals of the permanent magnet field motor 8 whenever the motor is unenergized. Circuit 65 comprises in series connection the movable contact 27 and the fixed contact 28 of switch 26, the normally closed contacts 22 and 23 of relay 16 and the normally closed contacts 52 and 53 of relay 46.

In order to effect positive displacements of the output shaft 40, clutch plates 70 and 71 of a magnetic clutch 72 having a solenoid coil 73 are connected between shaft 6 and the output shaft 40, the solenoid coil 73 being connected across the solenoid coil 14 of relay 16 by conductors 74 and 75, and the conductor 75 being grounded. For minimizing electrical arcing at the pickoff contacts 12, a unidirectional device 76 is connected across solenoid coil 14, a unidirectional device 77 is inserted in series with the conductor 74, and a condenser 78 is connected from the conductor 74 to ground. Additionally, the combination of unidirectional device 77 and condenser 78 keeps the magnetic clutch 72 energized for a short time after the removal of the D. C. power from the motor 8 to assure that any coasting of the motor which causes the tape to advance will also advance the output shaft 40. This feature prevents accumulation of output error.

For effecting negative displacements of the output shaft 40, clutch plates 80 and 81 of a magnetic clutch 82 having a solenoid coil 83 are connected between the motor shaft 6 and a reversing set of gears 84, the other side of reversing gears 84 being connected to drive output shaft 40. The solenoid coil 83 of magnetic clutch 82 and a unidirectional device 85 are connected across the solenoid coil 44 of relay 46 by conductors 86 and 87, conductor 86 being grounded. A unidirectional device 88 is inserted in conductor 87 and a condenser 89 is connected from this conductor to ground.

The predetermined program is established for positive displacement of shaft 6 by punching a first hole 30 along line $a—a'$ of tape 1 at a distance $d_1$ from a starting point O, the distance $d_1$ being equal to $t_1 \times s_1$ wherein $s_1$ is the lineal speed of the tape as driven by only the timing motor 7 (auxiliary motor being energized) and $t_1$ is the time at which the first revolution of motor shaft 6 is scheduled. An additional hole for each additional scheduled revolution of shaft 6 is punched along line $a—a'$; for example, holes 32 and 33 in combination with the starting hole 30 provide a total of three revolutions of shaft 6 at time $t_1$. The distance $e$ between the holes 30, 32 and 33 is made equal to $t_e \times s_2$ wherein $s_2$ is the lineal speed of the tape as driven by both the timing motor 7 and the auxiliary motor 8 and $t_e$ is the time required for shaft 6 to make one complete revolution. After the pair of pickoff contacts 12 traverses holes 33, the tape transport speed is reduced to speed $s_1$ until hole 34 appears at a later time $t_2$. For negative displacements of shaft 6 between time $t_1$ and $t_2$, holes such as 60, 61 and 62 are punched along the line $b—b'$ in accordance with the above procedure.

While the drawing illustrates the employment of tape which is programmed by punching holes at discrete locations thereon, it is to be understood that the holes in tape may be replaced with a sequence of any type of discrete discontinuities on any suitable medium. For example, small magnetized areas may be employed on a magnetic type tape for energizing a magnetic type of pickup head in contact with the magnetic tape.

It is to be understood that various modifications other than those above described may be effected by persons skilled in the art without departing from the principle and scope of the invention as defined in the appended claims.

What is claimed is:

1. As a programming device, means for translating a sequence of discrete discontinuities along at least one line on a tape into displacements of a controlled shaft, said displacements being directly proportional to the number of discrete discontinuities on said tape, said means comprising a sprocket mechanism driving said tape, a differential connected to drive said sprocket mechanism, a timing motor operatively connected to drive one input shaft of said differential, an auxiliary motor connected to drive the other input shaft of said differential, a first switch adapted to be actuated by one line of discontinuities on said tape, a second switch, actuating means driven by said auxiliary motor for closing said second switch and maintaining the closed state during one complete revolution of the shaft of said auxiliary motor, a relay having a solenoid coil and a pair of normally open contacts, a power source, first, second and third circuits connected across said power source, the said first circuit comprising in series connection said first switch and said solenoid coil, the second circuit comprising in series connection said pair of contacts and said auxiliary motor, and said third circuit comprising in series connection said second switch and said auxiliary motor.

2. A programming device as claimed in claim 1 wherein said second circuit includes said first switch.

3. A programming device as claimed in claim 1 wherein said relay additionally has a pair of normally closed contacts, and said second switch has a second fixed contact touching its movable contact when the switch is open and there is provided a third switch adapted to be actuated by the sequence of discrete discontinuities along a second line on said tape, a second relay having a solenoid coil, a pair of normally open contacts and a pair of normally closed contacts, a fourth and fifth circuit connected across said power source, the said fourth circuit comprising in series connection said third switch and said solenoid coil of said second relay, the fifth circuit comprising in series connection said pair of normally open contacts of said second relay and said auxiliary motor, a dynamic braking circuit comprising in series connection said auxiliary motor, the moving contact of said second switch, the said second fixed contact of said second switch, said pair of normally closed contacts of the first-mentioned relay, and said pair of normally closed contacts of said second relay, said programming device also including an output shaft, a first and second magnetic clutch connected between said auxiliary motor and said output shaft, said second magnetic clutch having a pair of reversing gears, the solenoid coil of said first magnetic clutch being connected across the solenoid coil of the first-mentioned relay and the solenoid coil of said second magnetic clutch being connected across the solenoid coil of said second relay.

4. A programming device for employing a tape with more than one line of punched holes to represent separate sequences of discrete discontinuities as claimed in claim 3 wherein said first and third switches each comprise a pair of pickoff contacts, the pickoff contacts of said first switch being aligned to make contact through holes in one line of holes in the tape and the pickoff contacts of said third switch being aligned to make contact through holes in a second line of holes in said tape.

5. A programming device as claimed in claim 4 wherein said second circuit includes said first switch and said fifth circuit includes said third switch.

6. A programming device as claimed in claim 5 wherein a unidirectional device is shunted across each solenoid coil of each relay, a condenser is shunted across each solenoid coil of each magnetic clutch and a second unidirectional device is inserted in series with each solenoid coil of each magnetic clutch.

References Cited in the file of this patent
UNITED STATES PATENTS

| | | |
|---|---|---|
| 2,142,882 | Benzon | Jan. 3, 1939 |
| 2,475,245 | Leauer et al. | July 5, 1949 |
| 2,484,968 | Sponaugle | Oct. 18, 1949 |
| 2,537,770 | Livingston et al. | Jan. 9, 1951 |
| 2,686,282 | Salamowouich | Aug. 10, 1954 |
| 2,736,852 | Nelson | Feb. 28, 1956 |
| 2,741,732 | Cunningham | Apr. 10, 1956 |